(12) United States Patent
Marjoram et al.

(10) Patent No.: US 6,695,102 B1
(45) Date of Patent: Feb. 24, 2004

(54) MAGNETORHEOLOGICAL TWIN-TUBE DAMPING DEVICE

(75) Inventors: Robert H. Marjoram, Holly Springs, NC (US); Michael J. Chrzan, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/335,335

(22) Filed: Dec. 31, 2002

(51) Int. Cl.[7] ............................................. F16F 9/53
(52) U.S. Cl. ................................................. 188/267.2
(58) Field of Search ........................... 188/267, 267.1, 188/267.2

(56) References Cited

U.S. PATENT DOCUMENTS

| | | | |
|---|---|---|---|
| 2,820,471 A | * | 1/1958 | Crowell ................... 137/251.1 |
| 3,059,915 A | * | 10/1962 | Kemelhor ................... 267/126 |
| 3,807,678 A | | 4/1974 | Karnopp et al. |
| 4,819,772 A | * | 4/1989 | Rubel ...................... 188/267.1 |
| 4,821,849 A | | 4/1989 | Miller |
| 4,881,172 A | | 11/1989 | Miller |
| 4,887,699 A | | 12/1989 | Ivers et al. |
| 4,936,425 A | | 6/1990 | Boone et al. |
| 5,161,653 A | * | 11/1992 | Hare, Sr. ................. 188/267.1 |
| 5,259,487 A | * | 11/1993 | Petek ...................... 188/267.1 |
| 5,276,623 A | | 1/1994 | Wolfe |
| 5,284,330 A | | 2/1994 | Carlson et al. |
| 5,316,112 A | * | 5/1994 | Kimura et al. ............ 188/267.1 |
| 5,396,973 A | * | 3/1995 | Schwemmer et al. ....... 188/267.1 |
| 5,652,704 A | | 7/1997 | Catanzarite |
| 5,712,783 A | | 1/1998 | Catanzarite |
| 5,964,455 A | | 10/1999 | Catanzarite et al. |
| 6,049,746 A | | 4/2000 | Southward et al. |
| 6,158,470 A | | 12/2000 | Ivers et al. |
| 6,471,018 B1 | * | 10/2002 | Gordaninejad et al. .. 188/267.1 |

* cited by examiner

*Primary Examiner*—Jack Lavinder
*Assistant Examiner*—Benjamin A Pezzlo
(74) *Attorney, Agent, or Firm*—Edward F. Murphy, III (57) ABSTRACT

A single fluid valve device operable for setting an overall viscous damping level, magnetic damping strength, and low speed damping profile. A stationary, controllable magnetorheological fluid valve device comprising a first annular body having gap setting features and controllable passageways formed within the fluid valve device, and a second body disposed adjacent to the first annular body, wherein the second body comprises a magnetic field generating means contained therein. A twin-tube damping device comprising an outer member containing an outer volume of magnetorheological fluid, an inner member containing an inner volume of magnetorheological fluid, a stationary, controllable fluid valve device disposed within the outer member, a piston rod mounted for movement with respect to the inner and outer members, a piston assembly attached to the piston rod and a pressurized volumetric compliance means.

3 Claims, 5 Drawing Sheets

MAGNETORHEOLOGICAL TWIN-TUBE DAMPING DEVICE

CROSS-REFERENCE TO RELATED APPLICATIONS

United States Utility Patent Application by St. Clair et al., entitled "ADJUSTABLE DAMPING CONTROL WITH END STOP" filed the same day as the present Application is related and hereby incorporated by reference.

BACKGROUND OF THE INVENTION

1. Field of the Invention

The present invention relates generally to the field of damped motion control such as suspension devices. More particularly, the present invention relates to a magnetorheological twin-tube damping device having tunable force characteristics controlled by a single magnetorheological valve component.

2. Description of the Related Art

In vehicle use, vibrations, shock and motion (resulting from uneven road surfaces, for example) are transferred to an operator through the vehicle's structure. These conditions may lead to dangerous vehicle operation, and over time, to operator fatigue, discomfort and possibly reduced health. Typically, seats and cabs used in commercial and public transportation vehicles, such as trucks and buses, include suspension systems that aid in reducing the discomfort felt by the vehicle operator. These suspension systems typically include a mechanical device, such as a damper, attached between two structural members, such as a frame and a vehicle chassis. Dampers are well known which use a fluid as the working medium to create damping forces/torques and to control vibration, motion and shock. In particular, controllable dampers are well known that include electrorheological fluid (ER), electrophoretic fluid (EP), magnetorheological fluid (MR), hydraulic fluid, etc. In simple suspension systems passive dampers may be used. In more complicated suspension systems, adjustable dampers and controllers may be used to control the movement of the damper components and prevent end stop collisions.

Various methods have been employed to control vibration in suspension systems. Generally, in such prior art control methods, operating conditions are obtained by at least one sensor which supplies system operating information to a processor that determines the appropriate primary control signal to be sent to an electromechanical device, such as a magnetorheological (MR) fluid damper, for controlling vibration. A number of the various prior art methods for controlling vibration are described in the following issued United States patents: "Skyhook Control" as described in U.S. Pat. No. 3,807,678 to Karnopp et al.; "Relative Control" as described in U.S. Pat. No. 4,821,849 to Miller; "Observer Control" as described in U.S. Pat. No. 4,881,172 to Miller; "Continuously Variable Control" as described in U.S. Pat. No. 4,887,699 to Ivers et al.; "Delayed Switching Control" as described in U.S. Pat. No. 4,936,425 to Boone et al.; "Displacement Control" as described in U.S. Pat. No. 5,276,623 to Wolfe; "Rate Control" as described in U.S. Pat. No. 5,652,704 to Catanzarite; "Modified Rate Control" as described in U.S. Pat. No. 5,712,783 to "Method for Auto-Calibration of a Controllable Damper Suspension System as described in U.S. Pat. No. 5,964,455 to Catanzarite; and "End Stop Control Method" as described in U.S. Pat. No. 6,049,746 to Southward et al.

A simple conventional controllable damper technique for suspension control involves using a controlled bleed arrangement to shape the force velocity curve in the low-speed region, and adjusts the control signal to the damper to control the desired level of control. One damper is used for each corner of the car, for example. However, there is no form of adjustable end stop control in these conventional systems.

A more advanced suspension control system used to maintain comfortable driving conditions by reducing vibration, shock, and motion is the Motion Master® Ride Management System offered for sale by the Lord Corporation (Lord Corporation, Cary, N.C.). The Motion Master® system is made up of four components. The first component is a position sensor operable for monitoring movement of a seat caused by changing road and operating conditions. The second is a controller that continuously receives signals from the position sensor, determines optimal damping forces and is capable of adjusting at a rate of about 180 times per second. The third is a shock absorber (damper) operable for responding to the controller within milliseconds. The last component is a ride mode switch that enables the vehicle operator to choose among different ride options, such as soft, medium and firm settings based on the operator's preference. The position sensor and shock absorber are separate units that are mounted between two structural bodies. The shock absorber contains a magnetically responsive fluid that when subjected to a magnetic field is capable of changing from a near-solid to a liquid and back in a matter of milliseconds. The stronger the magnetic field, the more viscous the fluid and the greater the damping force. Such MR shock absorbers are typically of monotube construction in which the controllable fluid valve device is incorporated into the piston of the damper. Major disadvantages of such configurations include the need for very tight dimensional tolerances of the components that define the flow passages in the piston, and an associated high cost to manufacture.

What is needed is a simple and inherently low-cost damping device and control method that overcomes the disadvantages discussed above.

BRIEF SUMMARY OF THE INVENTION

In a first aspect, the present invention describes a stationary, controllable fluid valve device comprising two bodies held in close proximity to one another that together form a complete magnetic circuit. A space between the two bodies defines a fluid pathway for magnetically responsive fluid. The two bodies are so designed that the magnetic flux in the gaps between the bodies is perpendicular to the fluid flow. The first annular body incorporates all the features that define the necessary gaps and passageways for magnetorheological fluid flow control. The second body incorporates magnetic field generating means such as an electric coil. A magnetic flux is generated by the magnetic field generating means and is carried by the magnetic circuit. The magnetic flux is directed to act upon the magnetorheological fluid in controllable passageways to provide controllable rheology changes, thereby restricting flow through the controllable passageways.

In a second aspect, the present invention describes a twin-tube damping device including the controllable fluid valve device disposed in a stationary position within the damping device. The twin-tube damping device is further comprised of an outer member containing an outer volume of magnetorheological fluid, an inner member containing an inner volume of magnetorheological fluid, a piston rod mounted for movement with respect to the inner and outer members and a piston assembly attached to the piston rod.

The piston assembly divides the inner volume of magnetorheological fluid into a first fluid-containing chamber and a second fluid-containing chamber. The controllable fluid valve device is operable for permitting magnetorheological fluid to flow from the first fluid-containing chamber to the second fluid-containing chamber, and from the second fluid-containing chamber to the first fluid-containing chamber. The damper also includes a pressurized compliance means to accommodate the fluid volumetric changes caused by both rod displacement and temperature effects.

In a third aspect, the piston assembly may comprise a pressurized accumulator. In the embodiment employing a pressurized accumulator, the piston rod may be a hollow rod that allows for pressurizing the damping device after assembly and magnetorheological fluid filling. The damper device may be filled via a hole in the center of a magnetic core that provides a convenient passage for evacuating and filling the damper device while limiting the reduction of flux area for the magnetic circuit.

The controllable fluid valve device of the present invention provides for the control of tunable force characteristics by a single magnetorheological valve component. Such a damper configuration may be controlled by a real-time control system, however, the nature of construction is such that it can provide the necessary features required by simplified controls such as basic adjustability and end stop control. The single fluid valve component is operable for the overall viscous damping level, magnetic damping strength and low-speed damping profile.

BRIEF DESCRIPTION OF THE DRAWINGS

A variety of specific embodiments of this invention will now be illustrated with reference to the Figures. In these Figures, like elements have been given like numerals.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Throughout the drawings, like elements are given like numerals. The controllable fluid valve device and magnetorheological twin-tube damping device described below apply to suspension systems, seating applications, cab suspensions, industrial automation, motion control and any application requiring a high-function damping device.

Figure 1:
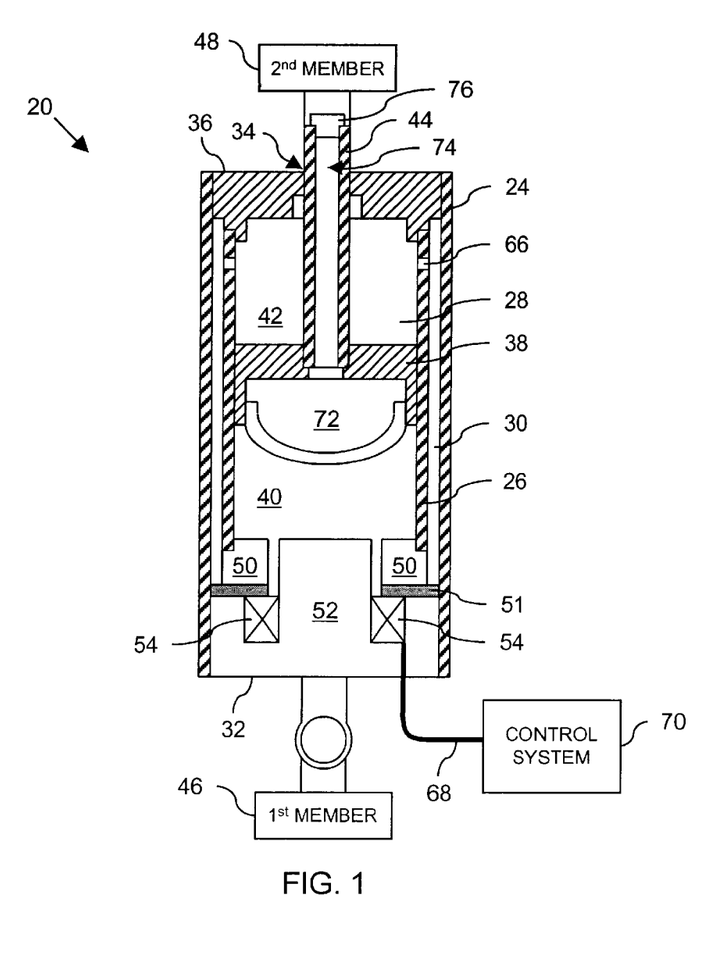
FIG. 1 is a cross-sectional illustration of a damping device comprising a stationary fluid valve device in accordance with an exemplary embodiment of the present invention.

Referring now to FIG. 1, shown generally at 20, is a first embodiment of a twin-tube magnetorheological (MR) damping device comprising a stationary controllable fluid valve device. The damping device 20 comprises an outer member 24 and an inner member 26, both members being of a generally cylindrical shape and concentrically aligned. An inner cavity 28 is disposed within the inner member 26. An outer cavity 30 is disposed between the outer member 24 and the inner member 26. The inner and outer cavities 28, 30 are interconnected and contain a volume of MR fluid. The outer member 24 comprises a first closed end 32 and an aperture 34 formed through a second end 36 that is generally opposed to the first closed end 32. A piston assembly 38 is slidably received within the inner cavity 28 and subdivides the inner cavity 28 into first and second chambers 40, 42 respectively, between which the working MR fluid flows. A piston rod 44 is secured to the piston assembly 38 and is slidably, and preferably sealingly, received within the aperture 34. The aperture 34 preferably includes a bearing and seal assembly, as is known to those of skill in the art. The bearing and seal assembly prevents the escape of the fluid and helps align the rod 44 and piston 38 within the inner member 26. The piston 38 and rod 44 are mounted within the inner cavity 28 and are adapted for sliding motion in sliding contact with the interior of the inner member 26. The piston 38 generally includes a soft piston band that provides a seal between the piston 38 and the tubular inner member 26.

The electro-mechanical damping device 20 may be attached between a first structural member 46 and a second structural member 48. The electro-mechanical damping device 20 is attached to the first and second structural members 46, 48 by way of appropriate fasteners. The first end 32 and piston rod 44 may include elastomer or other friction-reduced motion-accommodating assemblies, such as ball or pin joints. The first and second structural members 46, 48 may be any two relatively movable structures, such as a suspension component (e.g. frame, bracketry, linkages, etc.), a frame of a motor vehicle, a seat, etc.

The stationary, controllable fluid valve device within the damping device 20 comprises two metal bodies held in close proximity to one another that together form a complete magnetic circuit. A space between the two bodies defines a fluid pathway for magnetically responsive fluid. The two bodies are so designed that the magnetic flux in the gaps between the bodies is perpendicular to the fluid flow. A first annular body 50 incorporates all the features that define the necessary gaps and passageways for magnetorheological fluid flow control. The second body 52 incorporates magnetic field generating means, such as an electric coil 54. A magnetic flux is generated by the magnetic field generating means in the radial gap and between the lower surface of the first body 50 and the upper surface of the second body 52.

In one embodiment, the first and second bodies 50, 52 may be manufactured from a magnetic material, such as iron. Preferably, the first annular body 50 is held against the second body 52 by the stack of components located above the first annular body 50. In one example, the first annular body 50 may be held securely against the second body 52 by the inner member 26, as is illustrated in FIG. 1. The fluid valve device is firmly held within the outer member 24 of the damping device 20 when the damping device 20 is assembled.

Figure 2:
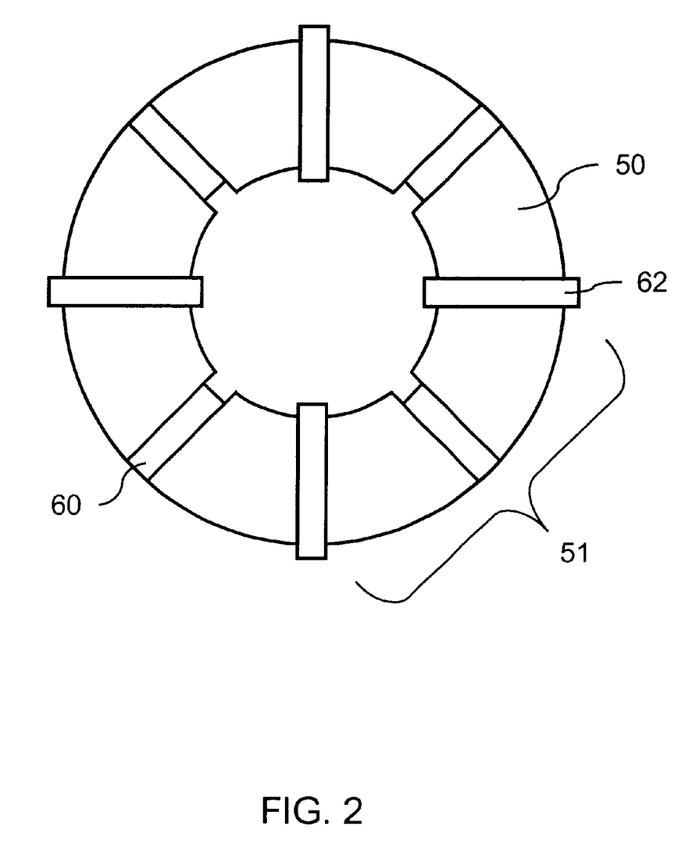
FIG. 2 is an illustration of a first annular body of the fluid valve device incorporating all the features that define the necessary gaps and passageways for magnetorheological fluid flow control in accordance with an exemplary embodiment of the present invention.

Referring now to FIG. 2, the annular shaped first body 50 comprises controllable passageways 51 defined by the shape of the first body 50. The controllable passageways 51 are the primary flow control for the fluid valve device. A plurality of additional fine-tuning channels 60 may be further defined by the shape of the first body 50. The passageways and channels 51, 60 are cut radially and axially to provide a MR fluid bleed path, a feature that provides a soft damping behavior at slower piston 38 speeds. The first body 50 further comprises a plurality of stand-off tab features 62 built into the ring. The magnetic flux is directed by precise gap settings set by the stand-off tabs 62. The stand-off tab features 62 are in the vicinity of the magnetic field generating means and determine the height of the flow passageways 51. The magnetic flux generated by the magnetic field generating means is directed to act upon the magnetorheological fluid in the controllable passageways 51 to provide controllable rheology changes, thereby restricting flow through the controllable passageways 51. The fluid valve device is a single device that sets the overall viscous damping level, magnetic damping strength and low speed damping profile, and is responsible for the complete tuning characteristics of the damping device 20.

Referring again to FIG. 1, the magnetic field generating means, such as a coil 54, is preferably located within, and supported by, the second body 52. The coil 54 is operable for generating a magnetic flux that is carried by the magnetic circuit. Energizing the coil with electrical current creates a magnetic field within the magnetic circuit that causes a rheology change, i.e., an alignment of the soft magnetic particles in the MR fluid in the controllable passageways 51 and fine-tuning channels 60. Notably, the MR fluid located elsewhere in the damping device 20, such as in the outer cavity 30, first chamber 40 and second chamber 42, is not exposed to any significant magnetic field and does not undergo a rheology change.

The MR fluid is contained within, and substantially fills, the controllable passageways 51, inner cavity 28 and outer cavity 30. When the damping device 20 strokes stes in compression, the damping action is provided by the flow of the MR fluid from the first chamber 40 through the controllable passageways 51 to the outer cavity 30, where the MR fluid is then returned to the second chamber 42 via openings 66 in the inner member 26. When the damping device 20 strokes in tension, the MR fluid flows from the second chamber 42 to the outer cavity 30 via the openings 66, then through the controllable passageways 51 and finally to the first chamber 40.

The damping device 20 contains a field responsive material or fluid, such as MR fluid. The fluid is a composition that undergoes a change in apparent viscosity in the presence of a magnetic field. In the presence of an applied magnetic field, microparticles in the fluid become polarized and are magnetically attracted to each other, which increases the apparent viscosity or flow resistance of the fluid. When the applied magnetic field is removed, the microparticles return to an unorganized or random state and the apparent viscosity of the MR fluid is lowered. Control is achieved by adjusting the control signal, which in turn adjusts the magnitude of the applied magnetic field, which adjusts apparent viscosity.

In another embodiment, passive passageways may be arranged in the damping device 20 in addition to the controllable passageways 51. The passive passageways may include a one-way check valve operative therewith. The check valve may be situated at the ends of the passive passageways, or in-between, so as to allow substantial flow of MR fluid in a first flow direction associated with movement of the piston assembly 38 in a first linear direction (e.g. compression), and substantially restrict flow of the MR fluid in a second flow direction associated with movement of the piston assembly 38 in a second linear direction (e.g. tension). Functionally, the one-way check valve acts as a bypass in one direction, allowing a substantial portion of the MR fluid to bypass the controllable passageways 51. The cross-sectional area of the passive passageways may be greater than or less than that of the controllable passageways 51. Notably, if a DC bias is applied to the coil 54, substantially all flow of MR fluid may be through the bypass, as the fluid in the controllable passageways 51 will be stationary.

In a further embodiment of the present invention, the passive passageways may be located in a position that is outside of the fluid valve device, such that the MR fluid passing through the passive passageways is not exposed to any substantial amount of the magnetic flux, i.e. magnetic field strength. The passive passageways may pass through the first body 50, or alternatively, pass about the first body 50. In general, it is desirable that the passive passageways be exposed to less than about 10 percent of the magnetic field strength exposed to the controllable passageways 51. Alternatively, the passive passageways may be located within the magnetic circuit and adjacent to an area of the fluid valve device exposed to a substantial magnetic field.

Wire leads 68 may provide a low voltage control signal (generally about 12 to about 48 Volts DC and electrical current of about several amps or less) from a control system 70 to the magnetic field generating means. The control system 70 may comprise one or more sensors, as described in detail below, and may provide appropriate input signals to the controller, if needed, for feedback and control. Control methods may include displacement information, acceleration and velocity, among others. The controllable fluid valve device provides for a passive damping mode and the damping device 20 force/velocity characteristics have to be carefully tuned to provide the required performance under constant current conditions. This is accomplished through a careful balance between MR flow control and bypass flow control or bleed. The bleed is provided by means of additional passive passageways, described above, either partially in the magnetic field or completely outside of the magnetic field. All of the controlled flow passageways 51 of the present invention are provided by the fluid valve device.

The piston assembly 38, as shown in FIG. 1, includes a pressurized volumetric compliance means 72 operable for providing an internal volume change. In one embodiment, the present invention may employ a single pressurized compliance means, such as a gas-filled accumulator, capable of being charged through the rod 44 via a charge passageway 74. When only one compliance is used, it is pressurized in order to avoid cavitation. The rod 44 is hollow and allows for an easy method by which to pressurize the device 20 after assembly. Appropriate gas charging is achieved via a fill valve 76. A certain level of pressure charge (about 100 psi or more) is needed to combat fluid cavitation under certain damping conditions.

Figure 3:
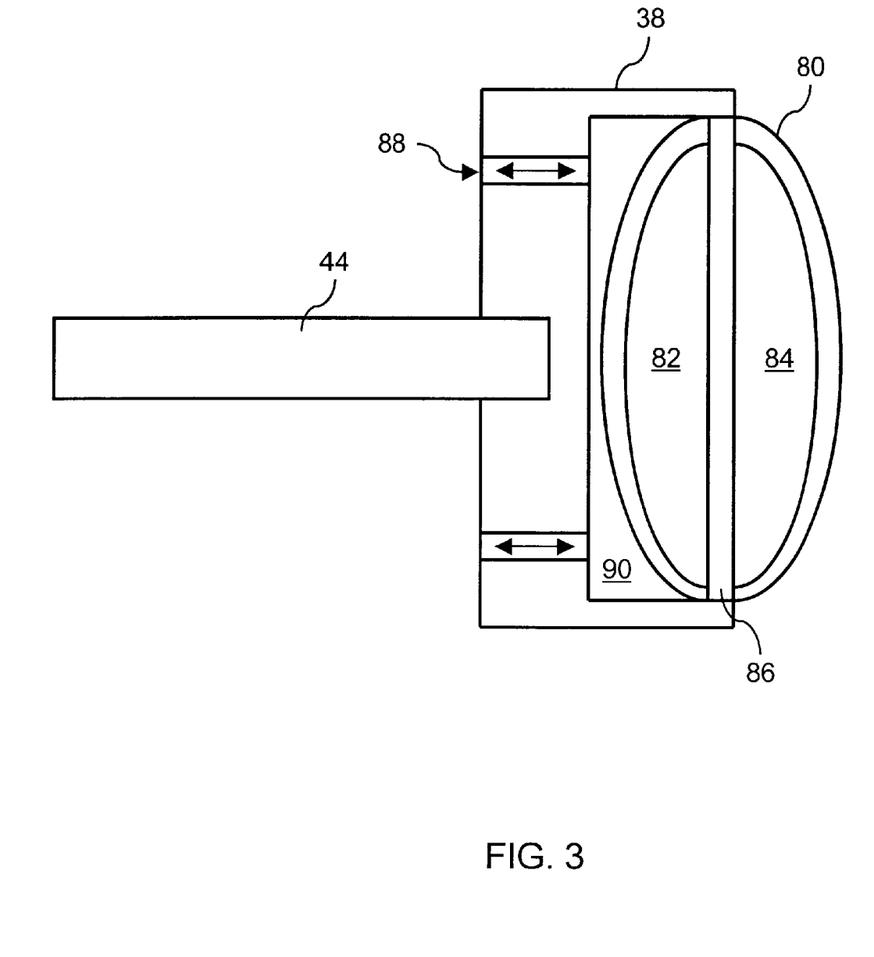
FIG. 3 is an illustration of a piston assembly comprising two compliance means in accordance with an exemplary embodiment of the present invention.

Referring now to FIG. 3, in an alternative embodiment illustrating decoupling, the present invention may employ two low-pressure volumetric compliance means 80. Each low-pressure compliance means 80 comprises an elastomeric bladder that may be filled with air, foam rubber, or another volumetrically compliant material. Each low-pressure compliance means 80 provides room for additional incompressible MR fluid resulting from displacement by piston rod 44 or from thermal fluid expansion. In this embodiment, no electrical connections are made through piston rod 44 and the two compliance means 80 do not allow fluid to flow past or through them. The two compliance means 80 are independent diaphragms 80, 82 separated by a divider 86. The diaphragms 82, 84 may be at atmospheric or slightly higher pressure. One diaphragm 84 is exposed to the upper surface of the first annular body 50, the other diaphragm 82 is exposed to the piston assembly 38. Both low-pressure compliance means 80 provide decoupling motion of the piston assembly 38 from fluid flow. When two compliance means are used, each one operates independently on the fluid volumes on either side of the piston assembly 38.

The compliance means 80 provide a small amount of damping for small amplitudes, and eliminate "stickiness" when a change in direction occurs. The piston assembly 38 of FIG. 3 further comprises fluid ports 88 that provide flow passageways for MR fluid from the second chamber 42 to a space between the piston assembly 38 and the compliance means 80, shown at 90. Other low-pressure designs may be employed in the practice of the present invention. One design includes a monotube design that employs a stationary low-pressure compliance means in the base of the damping device 20 and a moveable rod and piston assembly 38. A second design includes a twin-tube design that uses an outer sleeve to provide for volume compensation. Both designs include a small amount of decoupling motion in the performance of the devices suitable for certain applications.

A wear band coated with an appropriate friction-reducing treatment may encircle the outer periphery of the piston assembly 38 and provide appropriate clearance between the piston assembly 38 and inner member 26. Notably, passive passageways may be formed between the outer periphery of the wear band and the inner member 26 to allow a small portion of MR fluid flow therethrough, which reduces or eliminates harshness. The passive passageways may comprise a plurality of holes through the piston assembly 38. The passive passageways are substantially free from exposure to the magnetic field due to the distance from the magnetic field generating means.

Figure 4:
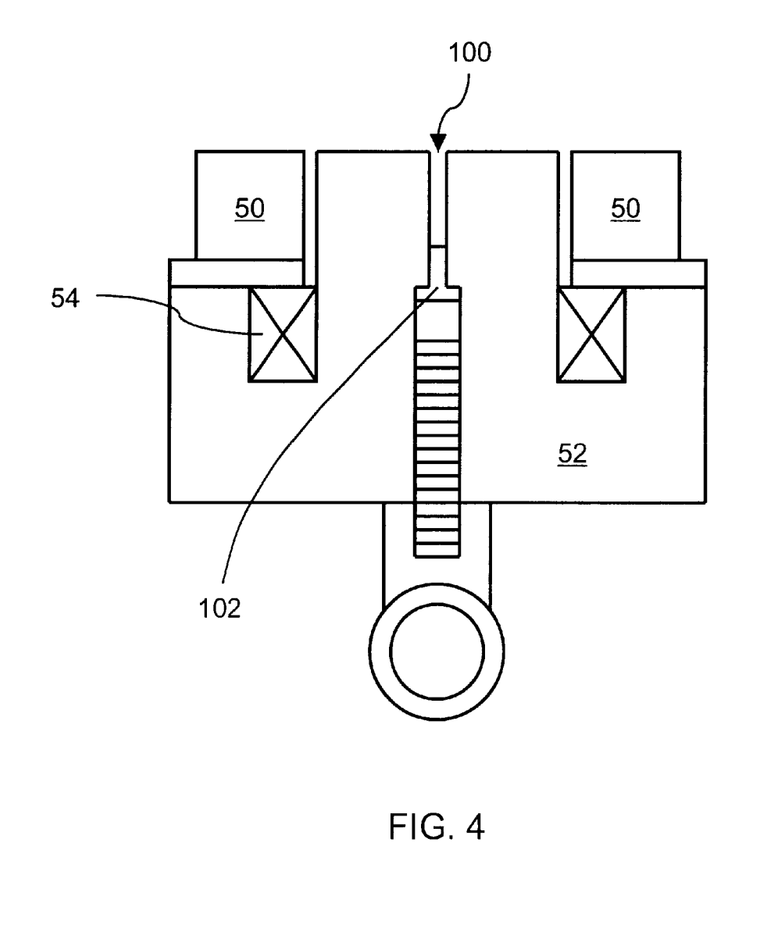
FIG. 4 is an illustration of a magnetic valve with a means for filling the damping device in accordance with an exemplary embodiment of the present invention.

Referring to FIG. 4, a means for evacuating the air from the damping device and then filling the device with MR fluid is shown. The damping device should be charged with the correct volume of fluid. A port 100 through the center of the magnetic core provides a convenient passage for evacuating and filling the damping device 20, while limiting the reduction of flux area for the magnetic circuit. The port 100 may be sealed with a rivet 102, sealing screw, O-ring or a combination of each.

The damping device 20 includes a first end of travel limit, or end stop, and a second end of travel limit, or end stop. The first end stop is defined as the upper surface of the first annular body 50, and the second end stop is defined as the second end of the outer member 24. The piston assembly 38 travels a predetermined distance as the suspension moves between its end stops. A large bump may cause the piston assembly 38 to encounter the end stops. The first and second end stops define the travel distance of the damping device 20 and correspond to the maximum and minimum separation distances that may exist between, for example, a structural member and a vehicle frame. A first (upper) control limit and a second (lower) control limit define the positions along the travel distance at which a simple sensor may be set to trip, changing the damping level by applying a predetermined function that generally increases the steady state current to the damping device 20.

The first and second control limits may be set at any predetermined position, depending upon operator preference, the environment in which the damping device 20 is being used, a manufacturer's preference, and the profile of a predetermined control function. The appropriate positioning of the end stop control limits may also be based on the type of pressurized compliance means used. For example, a high-pressure compliance means may require less distance to appropriately prevent the piston assembly from colliding with one of the end stops, as opposed to a low-pressure compliance means.

A sensor system used for further damping control, used in addition to the damping control provided by the controllable fluid valve device, may include one or more sensors. Examples of sensors include, but are not limited to, proximity sensors, displacement sensors, hall effect switches, micro switches, optical switches, velocity sensors, a rotating cam with a micro switch and any other non-contact switches or sensors operable for determining the position of the piston assembly 38 relative to the end stops. The sensor system is further operable for signaling the control system 70 when the suspension is nearing one of the end stops. In one embodiment, one sensor may be used to detect the position of the piston assembly 38 relative to the first and second control limits. In another embodiment, two sensors may be used, one at each end of the travel distance to detect the control limits. In still another embodiment, one sensor may be used to determine the position of the piston assembly 38 relative to the end stops, while a second sensor is used to obtain estimates of velocity, as will be described in more detail below. When an end stop is approached, an input signal is detected by the sensor system. The sensor system sends an input signal from an output of the sensor system to an input of the control system 70.

The control system 70 may, using a variety of techniques, set the control signal supplied to the controllable fluid valve device to a predetermined level, causing the magnetic field generating means to apply a magnetic flux to the controllable passageways 51 to produce a predetermined force to help avoid contact at the suspension travel limits and control the damping. The control system 70 receives a signal from the sensor system when an end stop control limit is tripped, and determines and generates an end stop function. With the use of the sensor that is set to trip at some selected position, for example at about 20% distance inward from the travel limits, the damping level may be changed by applying an increased current to the magnetic field generating means. The control system 70 may include a simple analog or digital controller to provide adjustable damping, an appropriate microprocessor, and/or a memory to implement the overall control in accordance with the present invention. The end stop function controls a damping force applied to the system by the damping device 20 to prevent the suspension system from encountering the first and second end stops. Optimal end stop transition may be achieved by ramping up or down the damping force. The control system 70 and the sensor system may be located in the same housing or they may be discrete components located in separate housings.

In various embodiments, the control system 70 is operable for adjusting the control signal supplied to the fluid valve device at an increased/decreased level to avoid contact at the suspension end stop limits and reduce vibration and motion between the first and second structural members 46, 48. The control system 70 is further operable for turning the damping off or reducing the level of damping to avoid unwanted forces when the suspension system reverses its direction from the end stop and crosses back across a control limit. The control system 70 may execute one of several preprogrammed control functions depending upon the situation, such as applying one control function in the case of the suspension traveling just past the end stop control limits, as compared to traveling well past the control limits almost approaching the suspension end stops.

Figure 5:
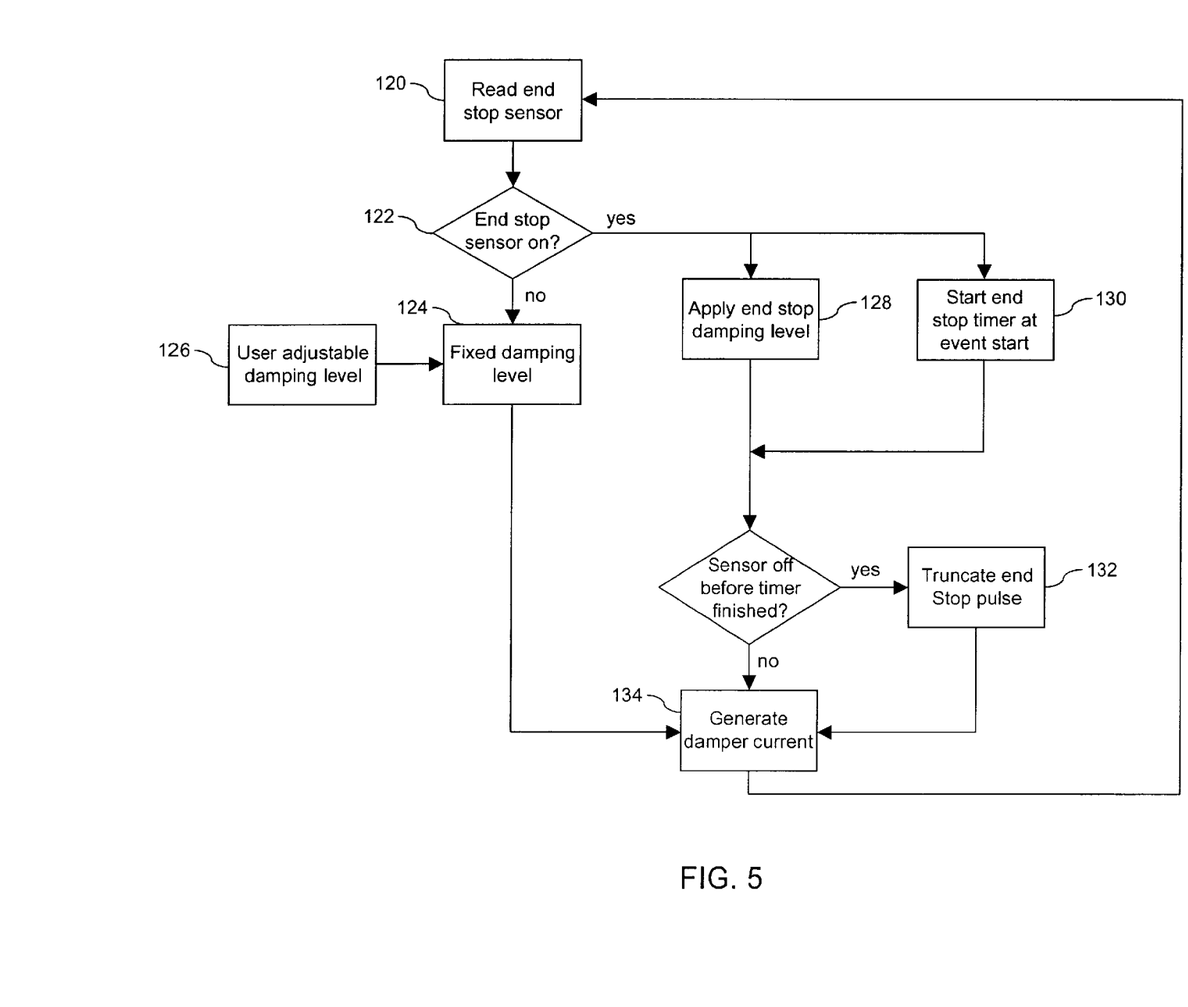
FIG. 5 is a schematic diagram illustrating one embodiment of an adjustable control system for controlling end stop collisions.

Referring now to FIG. 5, one control method for adjusting the control signal supplied to the damping device 20 includes using a timer to turn off the end stop control level after a predetermined time elapses. This embodiment operates very effectively in situations where the suspension travels well past the end stop control limits and near the end stops. The sensor system monitors (Block 120) the damping device 20 and its component positioning relative to the end stop control limits. In real-time, the sensor system sends an output to the control system 70 indicating if the end stop control limit has been reached (Block 122). If it is determined that the suspension travel has not reached the end stop control limit, then the suspension is in the first mode, and a fixed damping level is applied (Block 124). The fixed damping may be defined as the operating mode in which the suspension system travels between the first and second end stop control limits and does not cross those limits. The magnitude of the control signal applied to the damping device 20 during the steady state mode may be adjusted to provide a soft, medium, firm, or any other suspension setting. The setting may be adjusted by an operator (Block 126), or may be a predetermined setting based upon the type of application. If it is determined that the suspension travel has reached an end stop control limit the predetermined time damping profile is applied (Block 128). The crossing of the end stop control limits triggers a timer within the control system 70 to begin a timed pulse (Block 130) having a duration t.

In the situation in which the suspension has traveled past either one of the end stop control limits toward the end stops, the control system timer will run for a predetermined period (t) until the timer has timed-out. The time period (t) should be adjusted to be long enough to slow down a structural member, but short enough to allow the member to return to center. In the situation in which the suspension re-crosses the control limit back into the normal operating mode travel range, the control system 70 may cut short the end stop control pulse before the timer has run-out (Block 132). The magnitude of the damper control signal applied to the damping device 20 is then readjusted to apply the steady state mode (Block 134). By truncating the end stop pulse, suspension travel is greatly improved, especially in regards to smooth transitions.

In summary, it should be recognized from the foregoing that the present invention describes a MR twin-tube damping device with tunable force characteristics controlled by a single MR valve component that can be manufactured at lower cost than current designs for MR dampers. Such a damper configuration can be controlled by a real-time control system, however, the nature of the construction is such that it can provide the necessary features required by simplified controls such as basic adjustability and end stop control. One advantage of the design is the use of a single component that sets the overall viscous damping level, magnetic damping strength and low speed damping profile. In one embodiment, MR dampers with low-pressure compliance means are employed that provide a decoupling function in the damper characteristics. In another embodiment, a pressurized compliance means may be included in the damper piston assembly 38. By combining the complete tuning characteristics in one component, other components in damping devices may be universal and manufacturing expenses minimized. The tuning characteristics of the controllable fluid valve device may be matched to the requirements of control methods.

In terms of adjustability, the damping device 20 can operate in a passive mode, and so the damper force/velocity characteristic has to be carefully tuned to provide the required performance under constant current conditions. This is accomplished through a careful balance between MR flow control and bypass flow control (bleed). Bleed is provided by means of additional flow channels either partially in the magnetic field or completely outside the magnetic field. All such flow channels may be provided in this invention by a single tooled component, the fluid valve device. With changes to the flow passageways 51, high-speed real time control may be achieved similar to that of high-control suspension systems, such as the Motion Master® system described above.

It is apparent that there have been provided, in accordance with the systems and methods of the present invention, high-function damping control systems and methods. Although the systems and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A twin-tube damping device, comprising:

an outer member containing an outer volume of magnetorheological fluid;

an inner member containing an inner volume of magnetorheological fluid;

a stationary, controllable fluid valve device disposed within the outer member having a first annular body having controllable passageways formed within the fluid valve device operable for magnetorheological fluid flow control, and a second body in contact with the first annular body, wherein the second body comprises a magnetic field generating means contained therein capable of generating a magnetic field that is directed to act upon the magnetorheological fluid in the controllable passageways to provide controllable flow through the controllable passageways;

a piston rod mounted for movement with respect to the inner and outer members;

a piston assembly attached to the piston rod, wherein the piston assembly divides the inner volume of magnetorheological fluid into a first fluid-containing chamber and a second fluid-containing chamber; and at least one volumetric compliance means;

wherein the controllable fluid valve device is operable for permitting magnetorheological fluid to flow from the first fluid-containing chamber to the second fluid-containing chamber, and from the second fluid-containing chamber to the first fluid-containing chamber wherein the piston assembly comprises two independent pressurized volumetric compliance means.

2. A twin-tube damping device, comprising:

an outer member containing an outer volume of magnetorheological fluid;

an inner member containing an inner volume of magnetorheological fluid;

a stationary, controllable fluid valve device disposed within the outer member having a first annular body having controllable passageways formed within the fluid valve device operable for magnetorheological fluid flow control, and a second body in contact with the first annular body, wherein the second body comprises a magnetic field generating means contained therein capable of generating a magnetic field that is directed to act upon the magnetorheological fluid in the controllable passageways to provide controllable flow through the controllable passageways;

a piston rod mounted for movement with respect to the inner and outer members;

a piston assembly attached to the piston rod, wherein the piston assembly divides the inner volume of magnetorheological fluid into a first fluid-containing chamber and a second fluid-containing chamber; and at least one volumetric compliance means;

wherein the controllable fluid valve device is operable for permitting magnetorheological fluid to flow from the first fluid-containing chamber to the second fluid-containing chamber, and from the second fluid-containing chamber to the first fluid-containing chamber wherein the piston assembly comprises two independent pressurized volumetric compliance means which are at atmospheric or higher pressure.

3. A twin-tube damping device, comprising:

an outer member containing an outer volume of magnetorheological fluid;

an inner member containing an inner volume of magnetorheological fluid;

a stationary, controllable fluid valve device disposed within the outer member having a first annular body having controllable passageways formed within the fluid valve device operable for magnetorheological fluid flow control, and a second body in contact with the first annular body, wherein the second body comprises a magnetic field generating means contained therein capable of generating a magnetic field that is directed to act upon the magnetorheological fluid in the controllable passageways to provide controllable flow through the controllable passageways;

a piston rod mounted for movement with respect to the inner and outer members;

a piston assembly attached to the piston rod, wherein the piston assembly divides the inner volume of magnetorheological fluid into a first fluid-containing chamber and a second fluid-containing chamber; and at least one volumetric compliance means;

wherein the controllable fluid valve device is operable for permitting magnetorheological fluid to flow from the first fluid-containing chamber to the second fluid-containing chamber, and from the second fluid-containing chamber to the first fluid-containing chamber wherein the at least one volumetric compliance means comprises a gas-filled accumulator and the piston rod is a hollow rod that allows for pressurizing the damping device after assembly.

* * * * *